United States Patent
Choi

(10) Patent No.: US 11,087,477 B2
(45) Date of Patent: Aug. 10, 2021

(54) TRAJECTORY PREDICTION

(71) Applicant: Honda Motor Co., Ltd., Tokyo (JP)

(72) Inventor: Chiho Choi, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 16/524,821

(22) Filed: Jul. 29, 2019

(65) Prior Publication Data

US 2021/0035310 A1 Feb. 4, 2021

(51) Int. Cl.
*G06N 3/04* (2006.01)
*G06T 7/246* (2017.01)
*G06N 3/08* (2006.01)

(52) U.S. Cl.
CPC .............. *G06T 7/251* (2017.01); *G06N 3/04* (2013.01); *G06N 3/08* (2013.01); *G06T 2207/10016* (2013.01); *G06T 2207/30236* (2013.01); *G06T 2207/30241* (2013.01); *G06T 2207/30261* (2013.01)

(58) Field of Classification Search
CPC ............. G06T 7/251; G06N 3/04; G06N 3/08
See application file for complete search history.

(56) References Cited

U.S. PATENT DOCUMENTS

| | | |
|---|---|---|
| 2012/0046820 A1 | 2/2012 | Allard et al. |
| 2017/0190334 A1 | 7/2017 | Zelman et al. |
| 2018/0053093 A1 | 2/2018 | Olabiyi et al. |
| 2019/0025853 A1 | 1/2019 | Julian et al. |

FOREIGN PATENT DOCUMENTS

WO WO2018/089131 5/2018

OTHER PUBLICATIONS

Alexandre Alahi, Vignesh Ramanathan, and Li Fei-Fei. Socially-aware large-scale crowd forecasting. In Proceedings of the IEEE Conference on Computer Vision and Pattern Recognition, pp. 2203-2210, 2014.

(Continued)

*Primary Examiner* — Sam Bhattacharya
(74) *Attorney, Agent, or Firm* — Rankin, Hill & Clark LLP

(57) ABSTRACT

Trajectory prediction may receiving a LiDAR image sequence including a set of LiDAR images and generating a LiDAR map, generating an interaction encoder result by feeding the LiDAR image sequence through an interaction encoder, generating a feature extractor result by feeding the LiDAR map through a feature extractor, generating a relation encoder result by feeding a past trajectory of a detected obstacle from the LiDAR image sequence, the interaction encoder result, and the feature extractor result through a relation encoder, generating an intention estimation result by feeding the relation encoder result through an intention estimator, generating a conditional generative model result by feeding the past trajectory of the detected obstacle, the intention estimation result, and a probability map through a conditional generative model encoder, and generating a trajectory prediction by feeding the relation encoder result, the past trajectory of the detected obstacle, and the conditional generative model result through a trajectory predictor.

20 Claims, 8 Drawing Sheets

(56) References Cited

OTHER PUBLICATIONS

Alexandre Alahi, Kratarth Goel, Vignesh Ramanathan, Alexandre Robicquet, Li Fei-Fei, and Silvio Savarese. Social lstm: Human trajectory prediction in crowded spaces. In Proceedings of the IEEE Conference on Computer Vision and Pattern Recognition, pp. 961-971, 2016.
Chiho Choi and Behzad Dariush. Looking to relations for future trajectory forecast. arXiv preprint arXiv:1905.08855, 2019.
James Colyar and John Halkias. Us highway 101 dataset. Federal Highway Administration (FHWA), Tech. Rep. FHWA-HRT-07-030, 2007.
James Colyar and John Halkias. Us highway i-80 dataset. Federal Highway Administration (FHWA), Tech. Rep. FHWA-HRT-07-030, 2007.
Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In proceedings of the IEEE conference on computer vision and pattern recognition, pp. 3213-3223, 2016.
Nachiket Deo and Mohan M Trivedi. Multi-modal trajectory prediction of surrounding vehicles with maneuver based lstms. In 2018 IEEE Intelligent Vehicles Symposium (IV), pp. 1179-1184. IEEE, 2018.
Andreas Geiger, Philip Lenz, and Raquel Urtasun. Are we ready for autonomous driving? the kitti vision benchmark suite. In Conference on Computer Vision and Pattern Recognition (CVPR), 2012.
Agrim Gupta, Justin Johnson, Li Fei-Fei, Silvio Savarese, and Alexandre Alahi. Social gan: Socially acceptable trajectories with generative adversarial networks. In IEEE Conference on Computer Vision and Pattern Recognition (CVPR), No. CONF, 2018.
Sirin Haddad, Meiqing Wu, He Wei, and Siew Kei Lam. Situation-aware pedestrian trajectory prediction with spatio-temporal attention model. In Computer Vision Winter Workshop, 2019.
Irtiza Hasan, Francesco Setti, Theodore Tsesmelis, Alessio Del Bue, Fabio Galasso, and Marco Cristani. Mx-lstm: Mixing tracklets and vislets to jointly forecast trajectories and head poses. In the IEEE Conference on Computer Vision and Pattern Recognition (CVPR), Jun. 2018.
Dirk Helbing and Peter Molnar. Social force model for pedestrian dynamics. Physical review E, 51(5):4282, 1995.
Xin Huang, Stephen McGill, Brian C Williams, Luke Fletcher, and Guy Rosman. Uncertainty-aware driver trajectory prediction at urban intersections. arXiv preprint arXiv:1901.05105, 2019.
Namhoon Lee, Wongun Choi, Paul Vemaza, Christopher B Choy, Philip HS Torr, and Manmohan Chan-draker. Desire: Distant future prediction in dynamic scenes with interacting agents. In Proceedings of the IEEE Conference on computer Vision and Pattern Recognition, pp. 336-345, 2017.
Wei-Chiu Ma, De-An Huang, Namhoon Lee, and Kris M Kitani. Forecasting interactive dynamics of pedestrians with fictitious play. In Computer Vision and Pattern Recognition (CVPR), 2017 IEEE Conference on, pp. 4636-4644. IEEE, 2017.
Yuexin Ma, Xinge Zhu, Sibo Zhang, Ruigang Yang, Wenping Wang, and Dinesh Manocha. Trafficpredict: Trajectory prediction for heterogeneous traffic-agents. 2019.
Hyun Soo Park, Jyh-Jing Hwang, Yedong Niu, and Jianbo Shi. Egocentric future localization. In Proceedings of the IEEE Conference on Computer Vision and Pattern Recognition, pp. 4697-4705, 2016.
Seong Hyeon Park, ByeongDo Kim, Chang Mook Kang, Chung Choo Chung, and Jun Won Choi. Sequence-to-sequence prediction of vehicle trajectory via lstm encoder-decoder architecture. In 2018 IEEE Intelligent Vehicles Symposium (IV), pp. 1672-1678. IEEE, 2018.
Vasili Ramanishka, Yi-Ting Chen, Teruhisa Misu, and Kate Saenko. Toward driving scene understanding: A dataset for learning driver behavior and causal reasoning. In Conference on Computer Vision and Pattern Recognition, 2018.
Amir Sadeghian, Vineet Kosaraju, Ali Sadeghian, Noriaki Hirose, and Silvio Savarese. Sophie: An attentive gan for predicting paths compliant to social and physical constraints. arXiv preprint arXiv:1806.01482, 2018.
Christoph Schöller, Vincent Aravantinos, Florian Lay, and Alois Knoll. The simpler the better. Constant velocity for pedestrian motion prediction. arXiv preprint arXiv:1903.07933, 2019.
Anirudh Vemula, Katharina Muelling, and Jean Oh. Social attention: Modeling attention in human crowds. In 2018 IEEE International Conference on Robotics and Automation (ICRA), pp. 1-7. IEEE, 2018.
Yanyu Xu, Zhixin Piao, and Shenghua Gao. Encoding crowd interaction with deep neural network for pedestrian trajectory prediction. In Proceedings of the IEEE Conference on Computer Vision and Pattern Recognition, pp. 5275-5284, 2018.
Hao Xue, Du Q Huynh, and Mark Reynolds. Ss-lstm: A hierarchical lstm model for pedestrian trajectory prediction. In 2018 IEEE Winter Conference on Applications of Computer Vision (WACV), pp. 1186-1194. IEEE, 2018.
Takuma Yagi, Karttikeya Mangalam, Ryo Yonetani, and Yoichi Sato. Future person localization in first-person videos. In the IEEE Conference on Computer Vision and Pattern Recognition (CVPR), Jun. 2018.
Kota Yamaguchi, Alexander C Berg, Luis E Ortiz, and Tamara L Berg. Who are you with and where are you going? In Computer Vision and Pattern Recognition (CVPR), 2011 IEEE Conference on, pp. 1345-1352. IEEE, 2011.
Yu Yao, Mingze Xu, Chiho Choi, David J Crandall, Ella M Atkins, and Behzad Dariush. Egocentric vision-based future vehicle localization for intelligent driving assistance systems. In IEEE International Conference on Robotics and Automation (ICRA). IEEE, 2019.
Shuai Yi, Hongsheng Li, and Xiaogang Wang. Understanding pedestrian behaviors from stationary crowd groups. In Proceedings of the IEEE Conference on Computer Vision and Pattern Recognition, pp. 3488-3496, 2015.
International Search Report and Written Opinion of PCT/US20/40067 dated Sep. 28, 2020, 10 pages.

400A

400B

TRAJECTORY PREDICTION

BACKGROUND

Forecasting future trajectory of traffic participants is generally a difficult task. Historically, interactions have been investigated from local surroundings assuming slower movement of people, which may not be applicable to vehicles with faster speeds and road layouts are rarely considered.

BRIEF DESCRIPTION

According to one aspect, a system for trajectory prediction may include a processor and a memory storing instructions, which when executed by the processor cause the processor to perform receiving a light detection and ranging (LiDAR) image sequence including a set of LiDAR images, generating a LiDAR map based on the LiDAR image sequence, generating an interaction encoder result by feeding the LiDAR image sequence through an interaction encoder, generating a feature extractor result by feeding the LiDAR map through a feature extractor, generating a relation encoder result by feeding a past trajectory of a detected obstacle from the LiDAR image sequence, the interaction encoder result, and the feature extractor result through a relation encoder, generating an intention estimation result by feeding the relation encoder result through an intention estimator, generating a conditional generative model result by feeding the past trajectory of the detected obstacle, the intention estimation result, and a probability map through a conditional generative model encoder, and generating a trajectory prediction for the obstacle by feeding the relation encoder result, the past trajectory of the detected obstacle, and the conditional generative model result through a trajectory predictor.

The interaction encoder result and the feature extractor result may be summed and provided as an input to the relation encoder. The feature extractor or the interaction encoder may include one or more 2D convolutional layers. The intention estimator may include one or more non-linear unit layers and one or more fully connected layers. The conditional generative model encoder may include one or more 2D convolutional layers and one or more fully connected layers. One or more of the 2D convolutional layers may be associated with a non-linear unit function. The trajectory predictor may include one or more fully connected layers and one or more deconvolutional layers. Generating the LiDAR map based on the LiDAR image sequence may include removing one or more dynamic obstacles from the LiDAR image sequence. The intention estimation result may be a probability distribution of intentional goals associated with different zones within an environment. The trajectory prediction may be a probability distribution of trajectories associated with the intentional goals associated with the different zones within the environment. A zone of the different zones may be a portion of an intersection.

According to one aspect, system for trajectory prediction may include a light detection and ranging (LiDAR) sensor, a processor, and a memory. The LiDAR sensor may receive a LiDAR image sequence including a set of LiDAR images. The memory may store instructions, which when executed by the processor cause the processor to perform generating a LiDAR map based on the LiDAR image sequence, generating an interaction encoder result by feeding the LiDAR image sequence through an interaction encoder, generating a feature extractor result by feeding the LiDAR map through a feature extractor, generating a relation encoder result by feeding a past trajectory of a detected obstacle from the LiDAR image sequence, the interaction encoder result, and the feature extractor result through a relation encoder, generating an intention estimation result by feeding the relation encoder result through an intention estimator, generating a conditional generative model result by feeding the past trajectory of the detected obstacle, the intention estimation result, and a probability map through a conditional generative model encoder, and generating a trajectory prediction for the obstacle by feeding the relation encoder result, the past trajectory of the detected obstacle, and the conditional generative model result through a trajectory predictor, and a vehicle system activating an associated vehicle system function based on the trajectory prediction for the obstacle.

The interaction encoder result and the feature extractor result may be summed and provided as an input to the relation encoder. The feature extractor or the interaction encoder may include one or more 2D convolutional layers. The intention estimator may include one or more non-linear unit layers and one or more fully connected layers. The conditional generative model encoder may include one or more 2D convolutional layers and one or more fully connected layers. One or more of the 2D convolutional layers may be associated with a non-linear unit function. The trajectory predictor may include one or more fully connected layers and one or more deconvolutional layers.

According to one aspect, a computer-implemented method for trajectory prediction may include receiving a light detection and ranging (LiDAR) image sequence including a set of LiDAR images, generating a LiDAR map based on the LiDAR image sequence, generating an interaction encoder result by feeding the LiDAR image sequence through an interaction encoder, generating a feature extractor result by feeding the LiDAR map through a feature extractor, generating a relation encoder result by feeding a past trajectory of a detected obstacle from the LiDAR image sequence, the interaction encoder result, and the feature extractor result through a relation encoder, generating an intention estimation result by feeding the relation encoder result through an intention estimator, generating a conditional generative model result by feeding the past trajectory of the detected obstacle, the intention estimation result, and a probability map through a conditional generative model encoder, and generating a trajectory prediction for the obstacle by feeding the relation encoder result, the past trajectory of the detected obstacle, and the conditional generative model result through a trajectory predictor.

The computer-implemented method for trajectory prediction may include summing the interaction encoder result and the feature extractor result and providing the sum as an input to the relation encoder. Generating the LiDAR map based on the LiDAR image sequence may include removing one or more dynamic obstacles from the LiDAR image sequence. The intention estimation result may be a probability distribution of intentional goals associated with different zones within an environment.

DETAILED DESCRIPTION

Figure 1:
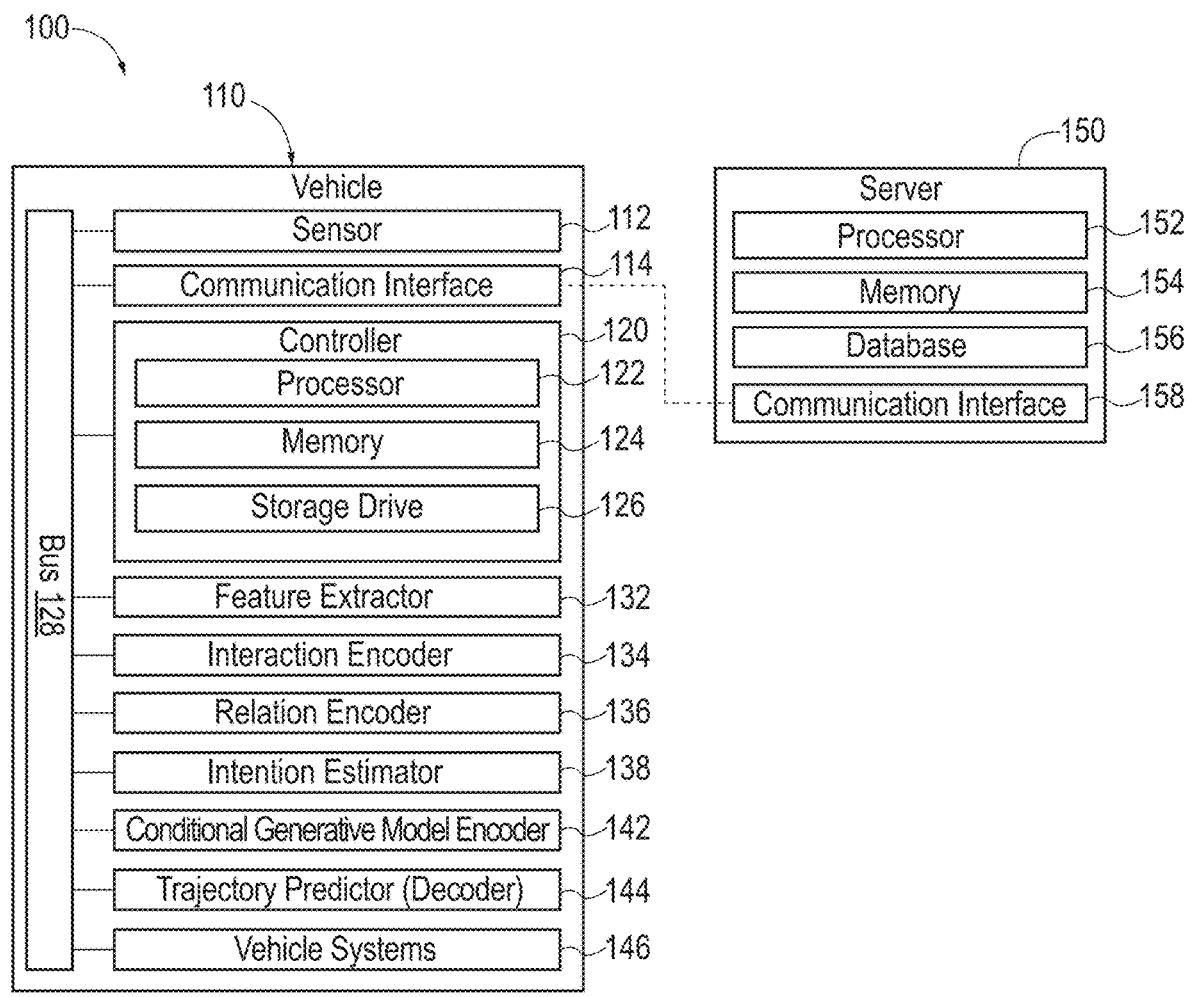
FIG. 1 is an exemplary illustration of a component diagram of a system for trajectory prediction, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle 110, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary illustration of a component diagram of a system 100 for trajectory prediction, according to one aspect. The system 100 for trajectory prediction of FIG. 1 may be implemented on a vehicle 110 and include a sensor 112, a communication interface 114, controller 120 including a processor 122, a memory 124, and a storage drive 126. The system 100 for trajectory prediction may include a bus 128 communicatively coupling one or more components described herein, a feature extractor 132, an interaction encoder 134, a relation encoder 136, an intention estimator 138, an encoder, such as a conditional generative model encoder 142, which may be a convolutional variational autoencoder (CVAE), a trajectory predictor 144, and one or more vehicle systems 146. The system 100 for trajectory prediction may be in computer communication with a server 150. The server may include a processor 152, a memory 154, a database 156, and its own communication interface 158 to facilitate the computer communication between the server 150 and the system 100 for trajectory prediction. The database 156 of the server 150 may store models trained by the system 100 for trajectory prediction.

Further, although described with respect to the processor 122 of the system 100 for trajectory prediction, any or one or more of the actions or steps performed by the processor 122 of the system 100 for trajectory prediction may be performed by the processor 152 of the server 150, according to one aspect.

According to one aspect, the sensor 112 may be a light detection and ranging (LiDAR) sensor or an image capture sensor. The sensor 112 may receive an image sequence, such as a LiDAR image sequence including a set of LiDAR images. The LiDAR images or set of LiDAR images may be decomposed into a LiDAR point cloud or collected by the sensor 112 as LiDAR point cloud. The image sequence may include images of an operating environment through which the vehicle 110 is travelling. The operating environment may include one or more obstacles (e.g., dynamic obstacles, objects, such as pedestrians, other vehicles, etc.). The obstacles may be stationary and/or be part of the operating environment (e.g., parked vehicles, buildings, curbs, road structures, etc.).

The processor 122 may generate a LiDAR map based on the LiDAR image sequence. The LiDAR map may be indicative of point information associated the LiDAR image sequence where dynamically moving agents or obstacles (e.g., moving vehicles or pedestrians, regardless of whether they are moving) are removed such that merely static elements, such as the road, sidewalks, buildings, lanes, remain. The remaining point cloud may be utilized by the processor 122 to build the LiDAR map of the operating environment. Stated another way, generating the LiDAR map based on the LiDAR image sequence may include removing one or more dynamic obstacles from the LiDAR image sequence and/or registering the remaining point clouds. In this way, the LiDAR map may be associated with the LiDAR point cloud, which may be a point cloud map of the static or stationary aspects of the operating environment.

According to one aspect, images of the image sequence, LiDAR images of the LiDAR image sequence, or the LiDAR map may be generated, processed, or transformed such that respective images are of a top-down view or from a birds-eye-view of the operating environment. In other words, raw LiDAR point clouds and 3D bounding boxes may be processed and projected into a top-down image coordinate.

Every $\tau+\delta$ (past and future) number of point clouds, we first transform this subset to the local coordinates at time $t=t_o-\tau+1$ using GPS/IMU position estimates in the world coordinate. Then, project these transformed point clouds onto the top-down image space that may be discretized with a resolution of 0.5 m, according to one aspect. Each cell in projected top-down images I may have a three-channel ($C_I=3$) representation of the height, intensity, and density. The height and intensity may be obtained by a laser scanner, and choose the maximum value of the points in the cell. The density may show how many points belong to the cell and may be computed by $\log(N+1)/\log(64)$, where N may be the number of points in the cell. The processor 122 may normalize each channel to be in the range of [0, 1]. From these projected top-down images I of size $H \times W \times C_I$ where $H=W=160$, the processor 122 may create the coordinates of past X and future trajectories $\mathcal{Y}$ in the local coordinates at time $t=t_0-\tau+1$. In addition, the processor 122 may remove dynamically moving agents (vehicles and pedestrians) from raw point clouds to only leave the static elements such as road, sidewalks, buildings, and lanes. Resulting point clouds are registered in the world coordinate and accordingly cropped to build a map M of size $H \times W \times C_M$ in the local coordinates at $t=t_0-\tau+1$ (same as $I_{t_0-\tau+1}$). The density may be always high when the ego-vehicle stops through a red light, and the height of the hilly road may not be consistent when registered. Therefore, according to one aspect, intensity values of $C_M=1$ may be used.

According to one aspect, the traditional definition of a node may be extended from an individual road user to a spatio-temporal feature representation obtained by exploiting spatial locality in the input images of the LiDAR image sequence. Thus, the edge captures relational behavior from spatio-temporal interactions of road users (e.g., other detected vehicles). An undirected and fully connected graph $\mathcal{G}=(\mathcal{V},\varepsilon)$ may be defined where $\mathcal{V}$ may be a finite set of $|\mathcal{V}|=n$ nodes and $\varepsilon$ may be a set of relational edges connecting each pair of nodes. Given $\tau$ number of input images, a node may be extracted $v_i \in \mathcal{V}$, where $v_i$ may be a d-dimensional vector representing spatio-temporal interactions within the i-th region of the discretized grid.

The feature $r_{ij}$ of the relational edge between two nodes $(v_i, v_j)$ first determines whether the given interaction pair has meaningful relations from a spatio-temporal perspective through the function $\emptyset$, and then the following function $\theta$ may be used to identify how their relations $r_{ij}$ can affect the future motion of the target agent k based on its past motion context $q^k$:

$$r_{ij}=\emptyset(v_{ij};W^r) \qquad (1)$$

$$f_{ij}^k=\theta(r_{ij},q^k;W^f) \qquad (2)$$

where $v_{ij}=v_i \boxtimes v_j$ is the concatenation of two nodes, $W^r$ denotes the weight parameters of $\emptyset$, $W^f$ is those of $\theta$, and $q^k$ is an m-dimensional feature representation extracted from the past trajectory $X^k=\{X_{t_0-\tau+1}^k, X_{t_0-\tau+2}^k, \ldots X_{t_0}^k\}$ of the k-th agent observed in the given perceptual information. Relational information $f_{ij}^k$ may be collected from all pairs and perform element-wise sum to produce a unique relational representation $\mathcal{F}^k=\Sigma_{i,j}f_{ij}^k$ for the k-th agent.

Knowledge of spatio-temporal relational inference $\mathcal{F}^k$ may be transferred to predict the probability of intentional goals as well as goal-oriented trajectories. To accomplish this, building blocks may be assembled from (i) relational inference to encode relational interactions of vehicles using a relational graph, (ii) intention estimation to compute the probability distribution of intentional goals based on the inferred relations from the perceptual context, and (iii) causal reasoning to reason about the goal-oriented behavior of drivers as future locations conditioned on the intentional destinations.

Given $X^k=\{I\ M, X^k\}$, the proposed framework aims to predict $\delta$ number of likelihood heatmaps $H^k=\{H_{t_0+1}^k, H_{t_0+2}^k, \ldots, H_{t_0+\delta}^k\}$ for the k-th target vehicle observed in I, where $I=\{I_{t_0+1}, I_{t_0+2}, \ldots, I_{t_0}\}$ is $\tau$ number of past LiDAR images and M is a top-down LiDAR map with a same coordinate with I. The processor 122 may determine a coordinate of a point with a maximum likelihood from each heatmap, which corresponds to the future locations $\mathcal{Y}^k=\{Y_{t_0+1}^k, Y_{t_0+2}^k, \ldots, Y_{t_0+\delta}^k\}$.

The feature extractor 132, the interaction encoder 134, the relation encoder 136, the intention estimator 138, the conditional generative model encoder 142, and the trajectory predictor 144 may be implemented via the processor 122 and memory 124 of the system 100 for trajectory prediction.

The feature extractor 132 may generate a feature extractor result based on the LiDAR map. In other words, the LiDAR map may be fed through the feature extractor 132 to generate the feature extractor result. The feature extractor 132 may include one or more 2D convolutional layers or convolutional layers.

The interaction encoder 134 may generate an interaction encoder result based on the LiDAR image sequence. In other words, the LiDAR image sequence may be fed through the interaction encoder 134 to generate the interaction encoder result. The interaction encoder 134 may include one or more 2D convolutional layers or convolutional layers. According to one aspect, the feature extractor 132 and the interaction encoder 134 may have an identical structure of 2D convolutional layers, but receive different inputs (e.g., the LiDAR sequence versus the LiDAR map, which may be a single image). In this way, spatial behavior may be encoded from the set of images using 2D convolutions.

The relation encoder 136 may generate a relation encoder result based on a past trajectory of a detected obstacle from the LiDAR image sequence, the interaction encoder result, and the feature extractor result. The past trajectory of the detected obstacle may be past motion of the detected obstacle, which may be a detected vehicle. In other words, the past trajectory of the detected obstacle from the LiDAR image sequence, the interaction encoder result, and the feature extractor result may be fed through a relation encoder to generate the relation encoder result. According to one aspect, the interaction encoder result and the feature extractor result may be summed and provided as an input to the relation encoder 136. By summing the interaction encoder result and the feature extractor result (e.g., which may be associated with the LiDAR map) and providing the sum as an input to the relation encoder 136, more accurate trajectory prediction may be achieved, such as by using 3D convolution, for example.

The feature extractor result, the interaction encoder result, and the relation encoder result may be utilized by the processor 122 to generate a relational inference which may be indicative of the relational behavior of vehicles (e.g., detected or sensed vehicles) within the operating environment. In other words, a causal relationship between intention and behavior of drivers may be derived from the observation (e.g., via the sensor 112 over time) of their relational interactions toward the environment, which may be indicated by the feature extractor result, the interaction encoder result, and the relation encoder result.

A conditional prediction model may be built, by the processor 122, to forecast goal-oriented trajectories. This conditional prediction model may be trained with the following stages: (i) relational inference where relational interactions of vehicles may be encoded using the perceptual context; (ii) intention estimation to compute the probability distribution of intentional goals based on the inferred relations; and (iii) causal reasoning to infer the behavior of vehicles as future locations conditioned on the intentional destinations. The conditional probabilistic prediction model may be built to forecast goal-oriented trajectories. First, an estimate a probability distribution of the intention (i.e., potential destination) of vehicles may be made by the intention estimator 138.

Figure 6:
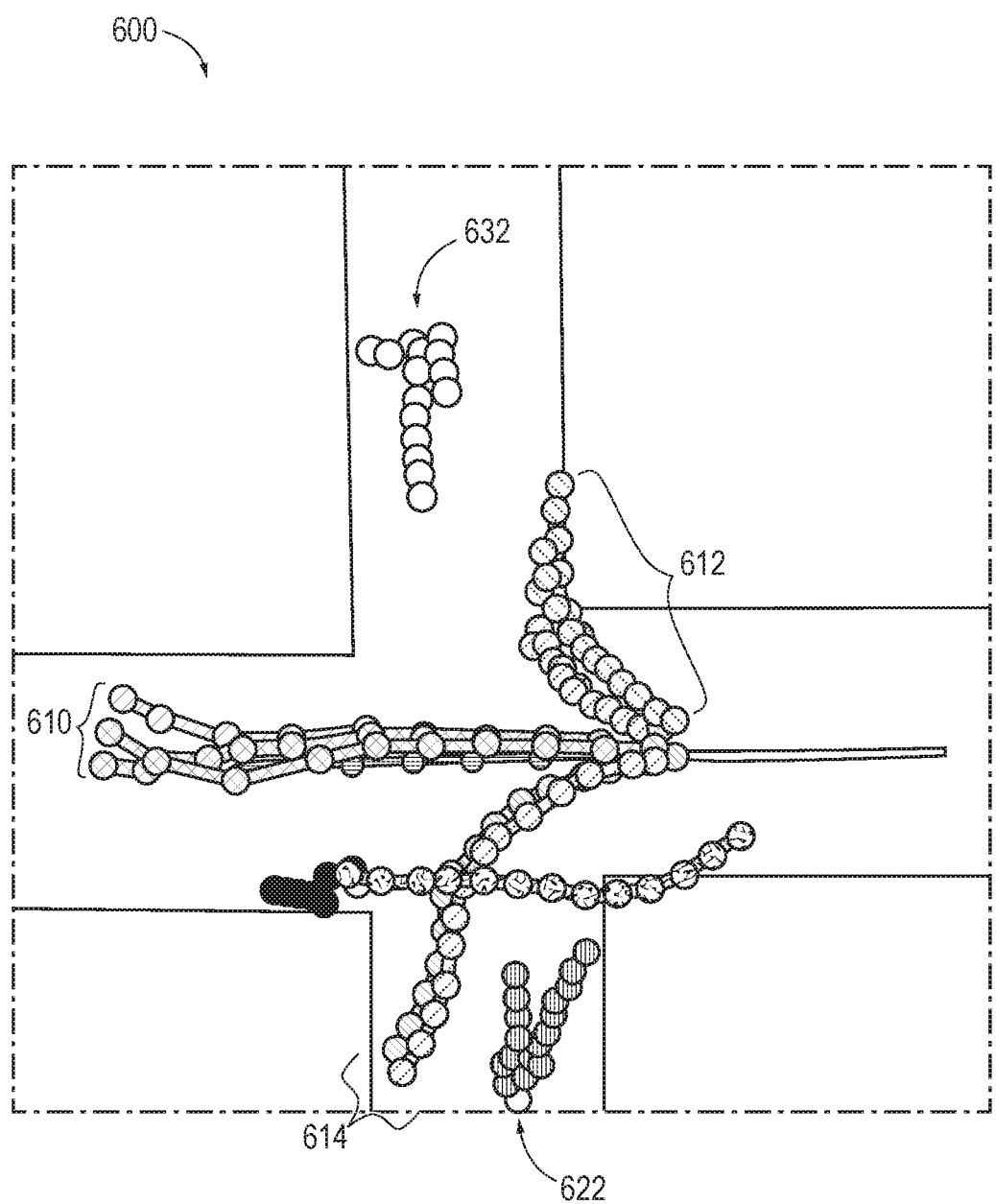
FIG. 6 is an exemplary illustration of a trajectory prediction of the system for trajectory prediction of FIG. 1, according to one aspect.

The intention estimator 138 may generate an intention estimation result based on the relation encoder result. In other words, the relation encoder result may be fed through the intention estimator 138 to generate the intention estimation result. The intention estimator 138 may include one or more rectified linear unit (ReLu) layers (e.g., as an activation function), one or more leaky ReLu layers, one or more non-linear layers, and one or more fully connected layers. The intention estimation result may be a probability distribution of intentional goals associated with different zones within the environment or the operating environment. This probability distribution may, according to some aspects, be represented as a heat map, as seen in FIG. 6, for example. Explained another way, the intention estimation result may be indicative of a likelihood or probability that the driver of the vehicle 110 or the controller 120 of the vehicle 110 desired to travel to an associated location, such as the different zones discussed herein. In other words, there may be a causal relationship between intention of the driver (e.g., intention estimation result) and the behavior of that driver. The intention estimation result may be an estimation of the intention of the driver's desired destination. This intention estimation result may be utilized to predict the future trajectory for the driver and his or her vehicle based on relational inferences, for example.

Based on the feature extractor result, the interaction encoder result, and the relation encoder result, the intention estimator 138 may analyze the relationship between the vehicle 110 being driven by the user or driver and other vehicles or associated interrelations, interactions, determine an estimated invention for respective vehicles, and determine an associated destination for respective vehicles.

Next, multi-modal trajectory prediction conditioned on the probability of the formerly estimated intention categories may be performed by the processor 122. The encoder or conditional generative model encoder 142 may generate a conditional generative model result or encoder result based on the past trajectory of the detected obstacle, the intention estimation result, and a probability map. In other words, the past trajectory of the detected obstacle, the intention estimation result, and the probability map may be fed through the encoder or conditional generative model encoder 142 to generate the conditional generative model result. The conditional generative model encoder 142 may include one or more 2D convolutional layers and one or more fully connected layers. One or more of the 2D convolutional layers may be associated with a non-linear unit function. According to one aspect, the conditional generative model encoder 142 may be any encoder or any conditional generative model encoder and the trajectory predictor 144 may be any decoder. During training, a model associated with the conditional generative model encoder 142 may be conditioned (e.g., as a conditional model).

According to one aspect, the output of the conditional generative model encoder 142 encoder may be a 512-dimensional factor (e.g., the first 256 may be a min and the next 256 may be variance). The input to the trajectory predictor 144 may be the same 256-dimensional factor and the feature extracted from the relation encoder 136 which may be masked by random numbers, which may be generated using an estimated median variance.

The conditional generative model encoder 142 may forecast multiple possible trajectories of each vehicle. For given observation c, a latent variable z may be sampled from the prior distribution $P(z|c)$, and the output heatmaps $\mathcal{H}$ are generated from the distribution $P(\mathcal{H}|z,c)$. As a result, multiple z drawn from the conditional distribution allows the system to model multiple outputs using the same observation c, where $c = q \boxtimes g$ is the concatenation of past motion context q encoded from X and estimated intention g.

In general, the true posterior $P(z|\mathcal{H},c)$ in maximum likelihood inference may be intractable. Consider an approximate posterior $Q(z|\mathcal{H},c)$ with variational parameters predicted by a neural network. The variational lower bound of the model is thus written as follows:

$$\log P(\mathcal{H}|c) \geq -KL(Q(z|\mathcal{H},c)P(z|c)) + \mathbb{E}_{Q(z|\mathcal{H},c)}[\log P(\mathcal{H}|z,c)] \quad (3)$$

and the objective with Gaussian latent variables becomes $$L_C = -KL(Q(z|\mathcal{H},c) \| P(z|c)) + \frac{1}{L}\sum_{l=1}^{L} \log P(\mathcal{H}|z_l, c) \quad (4)$$

where $z_l \sim Q(z_l|\mathcal{H},c) = N(0,I)$ is modeled as Gaussian distribution. The processor 122 may respectively build $Q(z|\mathcal{H},c)$ and $P(\mathcal{H}|z,c)$ as a conditional generative model encoder 142 encoder and trajectory predictor 144, on top of convolutional neural networks. At training time, the observed condition c is first concatenated with heatmaps $\mathcal{H}$, and train the conditional generative model encoder 142 encoder may be trained to learn to approximate the prior distribution $P(z|c)$ by minimizing the Kullback-Leibler divergence. Once the model parameters are learned, the latent variable z can be drawn from the same Gaussian distribution. At test time, the random sample $z \sim N(0,I)$ may be generated and masked with the relational features $\mathcal{F}$ using the element wise multiplication operator. The resulting variable may be passed through the trajectory predictor 144 and concatenated with the observation c to generate δ number of heatmaps $\hat{H}$.

The intention estimator 138 for the conditional generative model encoder 142-based prediction model may be trained to employ prior knowledge about the intention of vehicles (at time $t = t_0 + \delta$) for goal-oriented future prediction. Given the relational features $\mathcal{F}$ extracted from vehicle interactions, the softmax probability Sg may be estimated for each intention category $g \in \{0, 1, 2, 3, 4\}$ through a set of fully connected layers with a following ReLu activation function. The cross-entropy may be computed from the softmax probability:

$$\mathcal{L}_S = -\Sigma_{m=0}^{4} \mathbb{1}(m=g) \log S_g \quad (5)$$

where g may be an estimated intention category and $\mathbb{1}$ is the indicator function, which equals 1 if m equals g or 0 otherwise. The estimated intention g may be used to condition the process of model prediction. The computed softmax probability $S_g$ is later used at test time to sample z with respect to its distribution.

Figure 3:
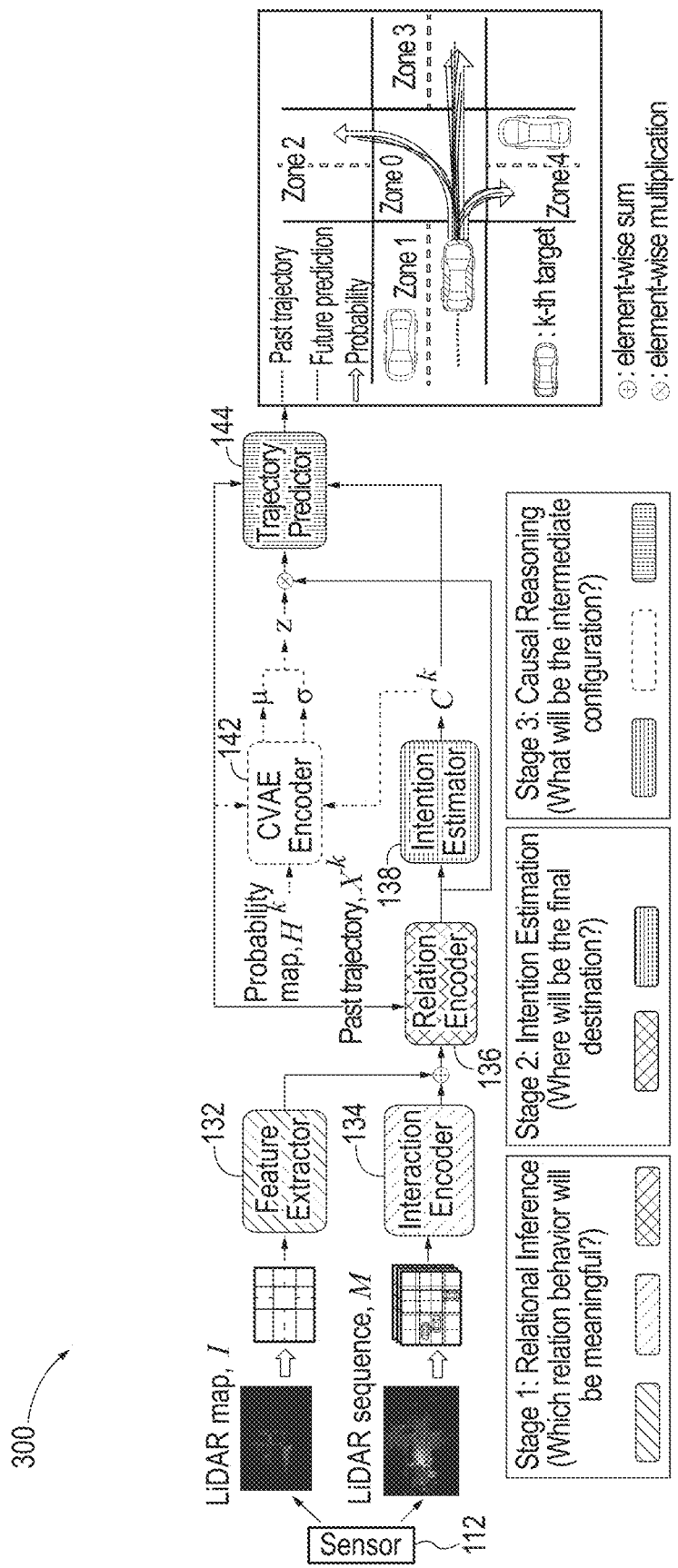
FIG. 3 is an exemplary illustration of an implementation of the system for trajectory prediction of FIG. 1, according to one aspect.

The trajectory predictor 144 may generate a trajectory prediction based on the relation encoder result, the past trajectory of the detected obstacle, and the conditional generative model result. For example, the relation encoder result, the past trajectory of the detected obstacle, and the conditional generative model result may be fed through the trajectory predictor 144. The trajectory predictor 144 may include one or more fully connected layers and one or more deconvolutional layers. The trajectory prediction may be a probability distribution of trajectories associated with the intentional goals associated with the different zones within the environment and may, according to some aspects, be represented as a heat map. A zone may be a portion of an intersection, as seen in FIG. 3, with reference to zone 0, zone 1, zone 2, zone 3, and zone 4, for example. Zones may be arbitrarily defined or defined based on probability distribution gradients between different areas of the environment.

According to one aspect, penalty terms designed to constrain the model toward reliance on perceptual scene context and spatio-temporal priors may be utilized.

Penetration Penalty

The penetration penalty encourages the model to forecast all future locations within a boundary of the drivable road in a given environment. To ensure that the predictions do not penetrate outside the road (i.e., sidewalks or buildings), the predicted heatmaps are checked and penalize any points outside the drivable road using the following term:

$$\mathcal{L}_P = \frac{1}{\delta} \sum_{t=t_0+1}^{t_0+\delta} \sum_{j=1}^{J} |D_j - B(\hat{\mathcal{H}}_{t,j})| \quad (6)$$

where the function B is the binary transformation with a threshold $\in_B$, D is the binary mask annotated as zero inside the drivable road, and $J = H \times W$ is the number of pixels in each likelihood heatmap.

Inconsistency Penalty

In order to restrict the model from taking unrealistic velocity changes between adjacent frames, temporal consistency may be encouraged between frames as a way to smooth the predicted trajectories. The current velocity at $t = t_0$ should be near to the velocity of both the previous frame ($t = t_0 - 1$) and next frame ($t = t_0 + 1$). The inconsistency penalty is defined as:

$$\mathcal{L}_I = \frac{1}{\delta - 1} \sum_{t=t_0+1}^{t_0+\delta-1} E(v_{t-1}, v_t, v_{t+1}) \quad (7)$$

where $v_t$ denotes velocity at time t and $$E(a,x,b) = \max(0, \min(a,b) - x) + \max(x - \max(a,b), 0) \quad (8)$$

is the term to softly penalize the predictions outside of the velocity range.

Dispersion Penalty

The model may be constrained to output more natural future trajectories, penalizing the cases where large prediction error is observed. In order to discourage the dispersion of an actual distance error distribution of the model, the following penalty may be utilized:

$$\mathcal{L}_D = \mathrm{Var}\left(\{\|Y_t - \hat{Y}_t\|_2^2\}_{t=t_0+1}^{t_0+\delta}\right) = \frac{1}{\delta}\sum_{t=t_0+1}^{t_0+\delta}(d_t - \bar{d})^2 \qquad (9)$$

where $d_t$ is an Euclidean distance between the predicted location and ground truth at time t and $\bar{d}$ denotes a mean of $d = \{d_{t_0+1}, \ldots, d_{t_0+\delta}\}$. The $\mathbb{l}_D$ penalty is particularly helpful to obtain accurate future locations with the concurrent use of the $\mathbb{l}_P$ term.

At training time, the total loss drawn may be minimized as follows:

$$\mathbb{l}_{Optimize} = \mathbb{l}_C + \mathbb{l}_S + \zeta\, \mathbb{l}_P + \eta\, \mathbb{l}_r + \mu\, \mathbb{l}_D \qquad (10)$$

The first two terms are primarily used to optimize the conditional generative model encoder 142 modules which aims to approximate the prior and generate actual likelihood predictions. The third term mainly leads the model's output to be in the drivable road, and the last two terms are involved in generation of more realistic future locations. The loss weights may be set as $\zeta=1$, $\eta=0.1$, and $\mu=0.01$ which properly optimized the entire network structures.

Based on the relation encoder result, the processor 122 or trajectory predictor 144 may estimate the specific intention of specific vehicles (e.g., intention estimation result). Based on these intention estimations (e.g., intention estimation result), future trajectory prediction may be conditioned for better causal reasoning. That is, reason causality between the intentional destination of an agent and its intermediate configuration may be made for more accurate predictions. In this way accurate vehicle trajectory forecast by considering behavioral intention of vehicles in traffic scenes may be provided. The system 100 for trajectory prediction may thus include a vehicle trajectory forecast framework which constructs a causal relationship between intention and behavior of drivers from their relational interactions. The vehicle trajectory forecast framework may be utilized to estimate the intention of vehicles by analyzing their relational behavior. One or more of the vehicle systems 146 may be activated, actuated, enabled, disabled, etc. based on the trajectory prediction. For example, collision avoidance, braking, etc. may be activated based on a predicted trajectory of another vehicle.

Figure 2:
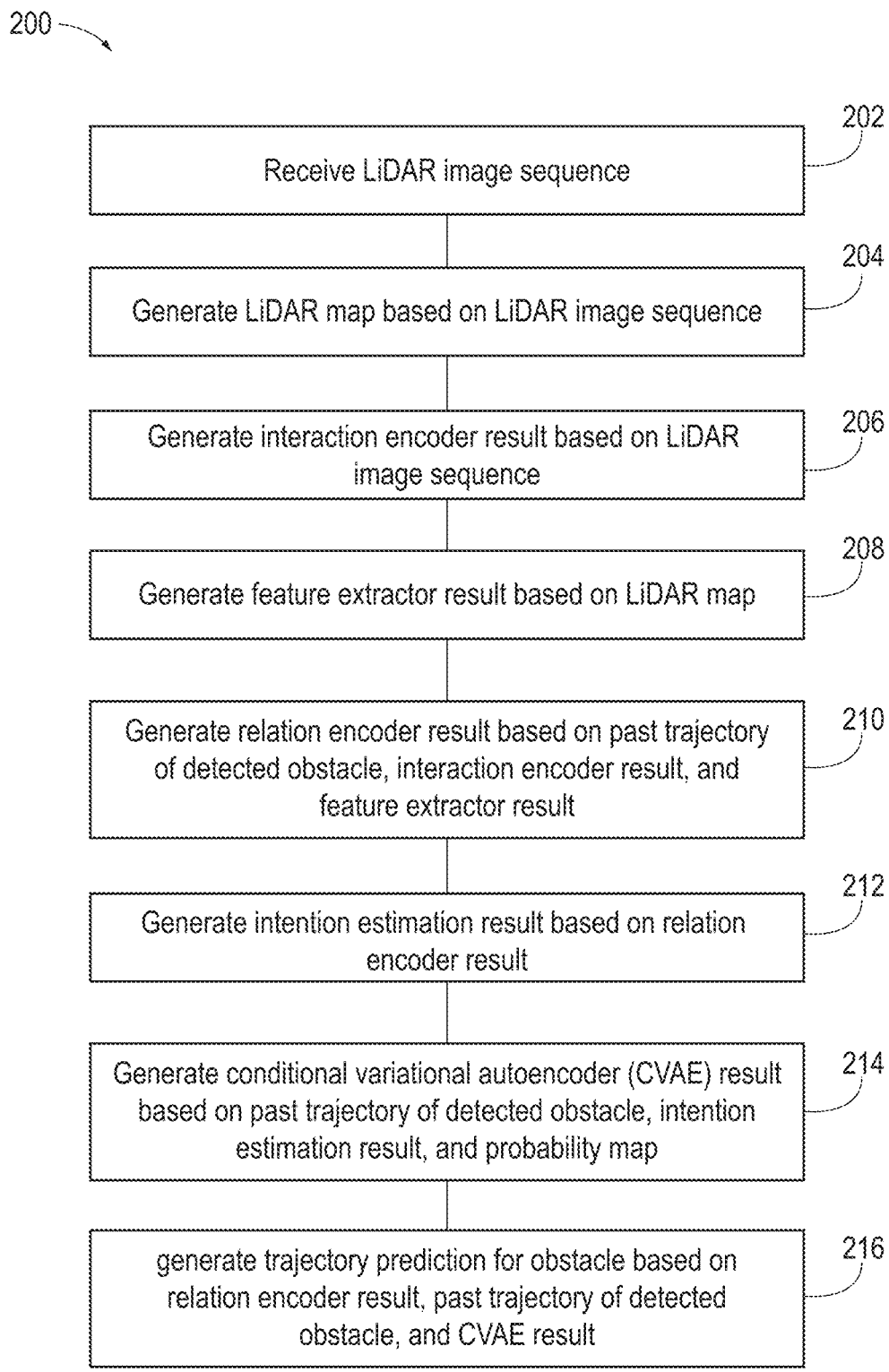
FIG. 2 is an exemplary illustration of a flow diagram of a method for trajectory prediction, according to one aspect.

FIG. 2 is an exemplary illustration of a flow diagram of a method for trajectory prediction, according to one aspect. The method for trajectory prediction may include receiving a LiDAR image sequence 202 including a set of LiDAR images, generating a LiDAR map 204 based on the LiDAR image sequence, generating an interaction encoder result 206 by feeding the LiDAR image sequence through an interaction encoder, generating a feature extractor result 208 by feeding the LiDAR map through a feature extractor, generating a relation encoder result 210 by feeding a past trajectory of a detected obstacle from the LiDAR image sequence, the interaction encoder result, and the feature extractor result through a relation encoder, generating an intention estimation result 212 by feeding the relation encoder result through an intention estimator, generating a conditional generative model result 214 by feeding the past trajectory of the detected obstacle, the intention estimation result, and a probability map through a conditional generative model encoder 142 encoder, and generating a trajectory prediction 216 for the obstacle by feeding the relation encoder result, the past trajectory of the detected obstacle, and the conditional generative model result through a trajectory predictor 144.

FIG. 3 is an exemplary illustration of an implementation 300 of the system 100 for trajectory prediction of FIG. 1, according to one aspect. With reference to the four zones depicted (e.g., zone 0, zone 1, zone 2, zone 3, and zone 4), based upon the path trajectory of the vehicle 110 and its intention of zone then the conditional generative model encoder 142 or encoder and decoder will train to output along that estimated zone. For example, the encoder may output two numbers, such as a first output as a min and a second output as a variance. Effectively, the conditional generative model encoder 142 or encoder and decoder may be trained to mimic the distribution of the data. If it is assumed that the target distribution will have a 0 min and a 1 variance, the conditional generative model encoder 142 or encoder may learn to embed the input feature into the same distribution with a 0 min and a 1 variance. Once this is done, the trajectory predictor 144 may make the locations. Although a 4-way intersection is depicted in FIG. 3, the system 100 for trajectory prediction may generate trajectory predictions for vehicles or agents in other types of environments.

Figure 4A:
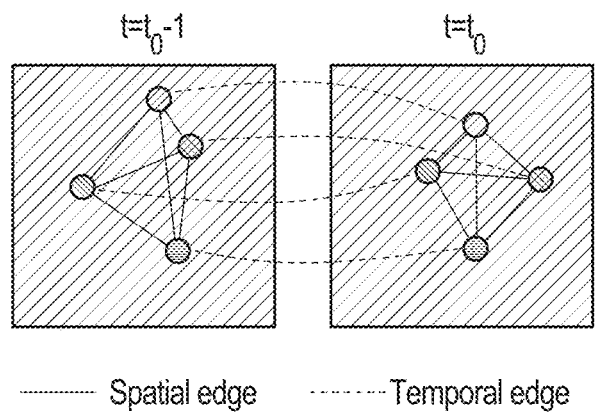
FIGS. 4A-4B are exemplary illustrations of models associated with trajectory prediction, according to one aspect.
Figure 4B:
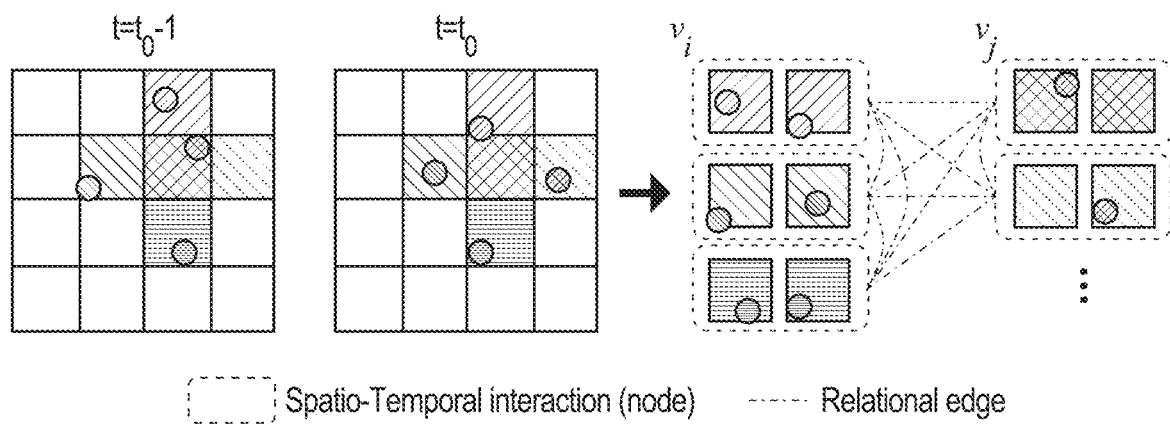

FIGS. 4A-4B are exemplary illustrations of models associated with trajectory prediction, according to one aspect. Spatio-temporal graph models 400A, 400B are introduced with nodes to represent road users and edges to express their spatio-temporal interactions with each other.

In FIG. 4A, two frames may be represented; a first frame at time $t=t_0-1$, and a second frame at time $t=t_0$. Each one of the nodes of each of the frames represents a vehicle and moving from the first frame to the second frame may be an advancement of a time step. The spatial differences between the nodes may be indicative or represent a change in the positions of the vehicles over the time step. In other words, based on each region over the two frames, and based on the region there may be some behaviors or motion of vehicle with respect to the other vehicles or environment.

These changes in the position of the vehicles across time may be indicated via spatial edges (e.g., solid lines) and temporal edges (e.g., dashed lines). Further, this information may be encoded using a convolutional neural network structure as a spatio-temporal interaction, for example. The connections between the nodes may be the spatial edge or the temporal edge. Using these relational edges, the interaction encoder 134 and the relation encoder 136 may infer the relational behavior of a given vehicle. To model spatio-temporal interactions, the spatial edges capture the relative motion of nodes at each time step, and temporal edges capture the temporal motion of each node between adjacent frame.

Spatio-temporal features may be visually computed using a convolutional kernel within a receptive field. In the spatio-temporal domain, these features not only contain spatio-temporal interactions of road users with each other, but also incorporate their interactions with the local environment.

In FIG. 4B, the spatio-temporal interactions for the first frame at time $t=t_0-1$ and the second frame at time $t=t_0$ may be represented across the 4×4 grid having 16 regions. From each region and at each time stamp, the processor 122 may encode spatial behavior inside that specific region. Vehicles may not necessarily be specified, and instead, regions are focused on due to the user of the convolutional layers.

Figure 5:
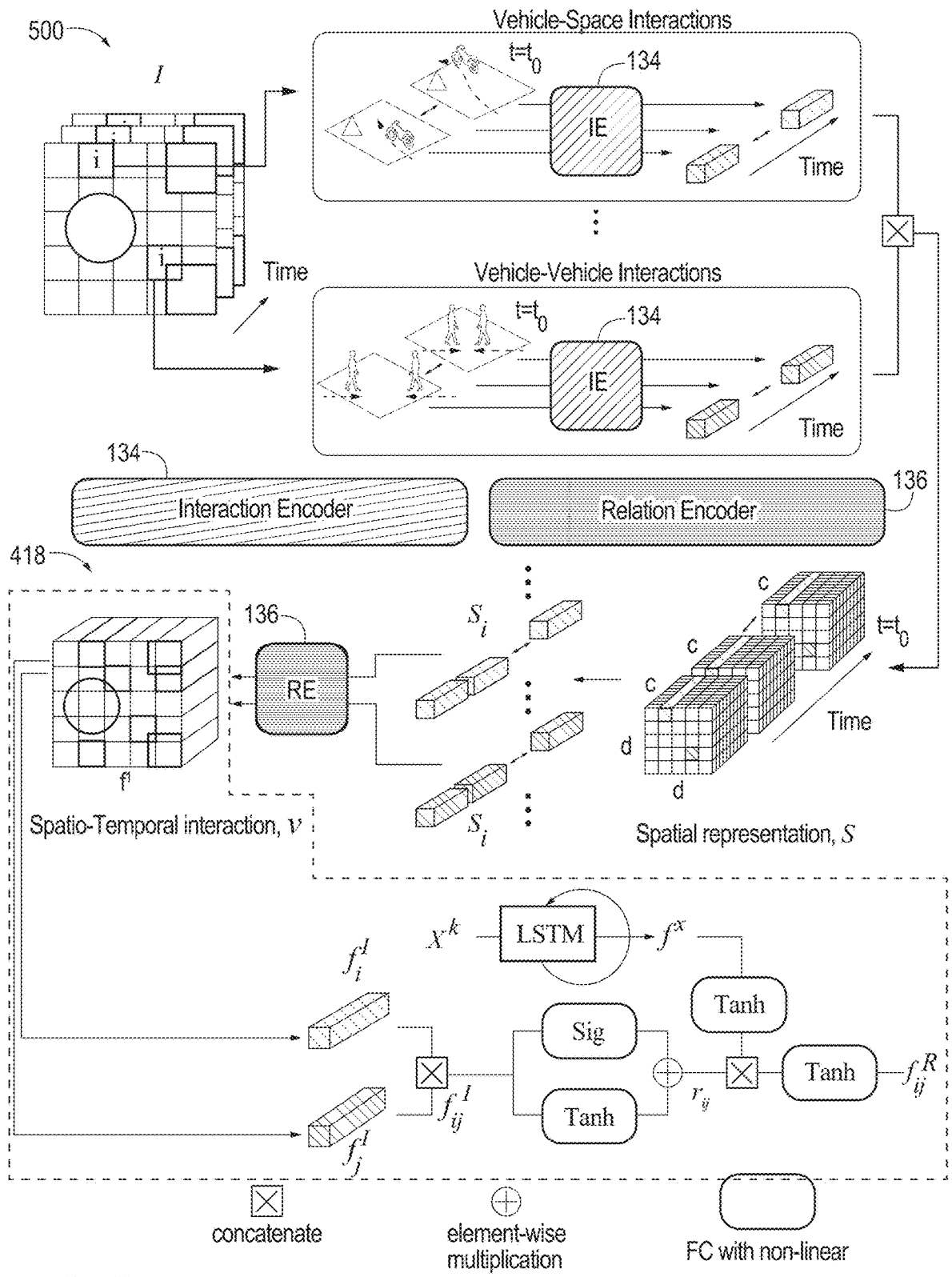
FIG. 5 is an exemplary illustration of an implementation of the system for trajectory prediction of FIG. 1, according to one aspect.

FIG. 5 is an exemplary illustration of an implementation 500 of the system 100 for trajectory prediction of FIG. 1, according to one aspect. In FIG. 5, the interaction encoder 134 may be utilized to derive spatial behavior information for each time step. Thereafter, these features may be concatenated along the time axis, and 3D convolution may be performed along the time axis. In this way, the encoding representative of the spatial interaction of the vehicles may be obtained. The relation encoder 136 may output the relation encoder 136 outputs as spatio-temporal interactions 418, $v_i$, $v_j$, which may be concatenated and processed to generate $f_{ij}^k$.

FIG. 6 is an exemplary illustration of a trajectory prediction of the system 100 for trajectory prediction of FIG. 1, according to one aspect or implementation 600. Different trajectory predictions may be shown in probability distributions 610, 612, 614, 622, and 632.

Figure 7:
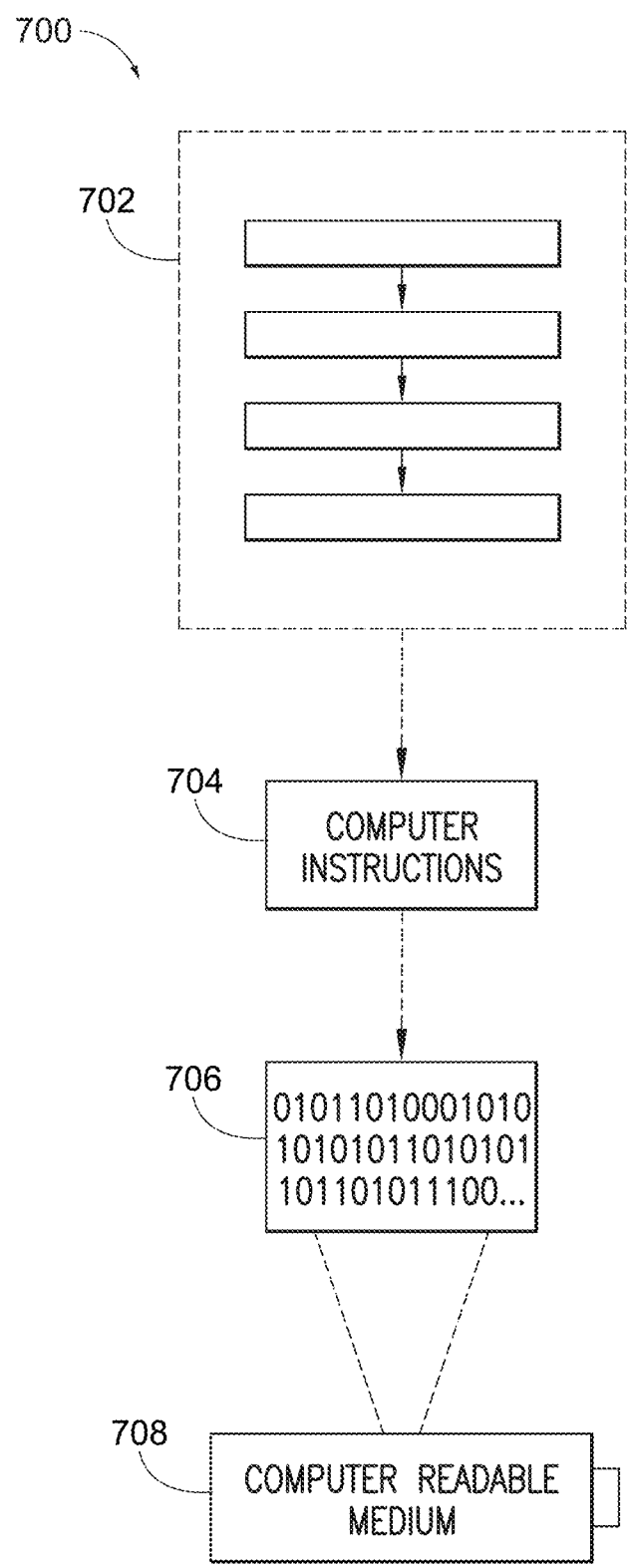
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 200 of FIG. 2. In another aspect, the processor-executable computer instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
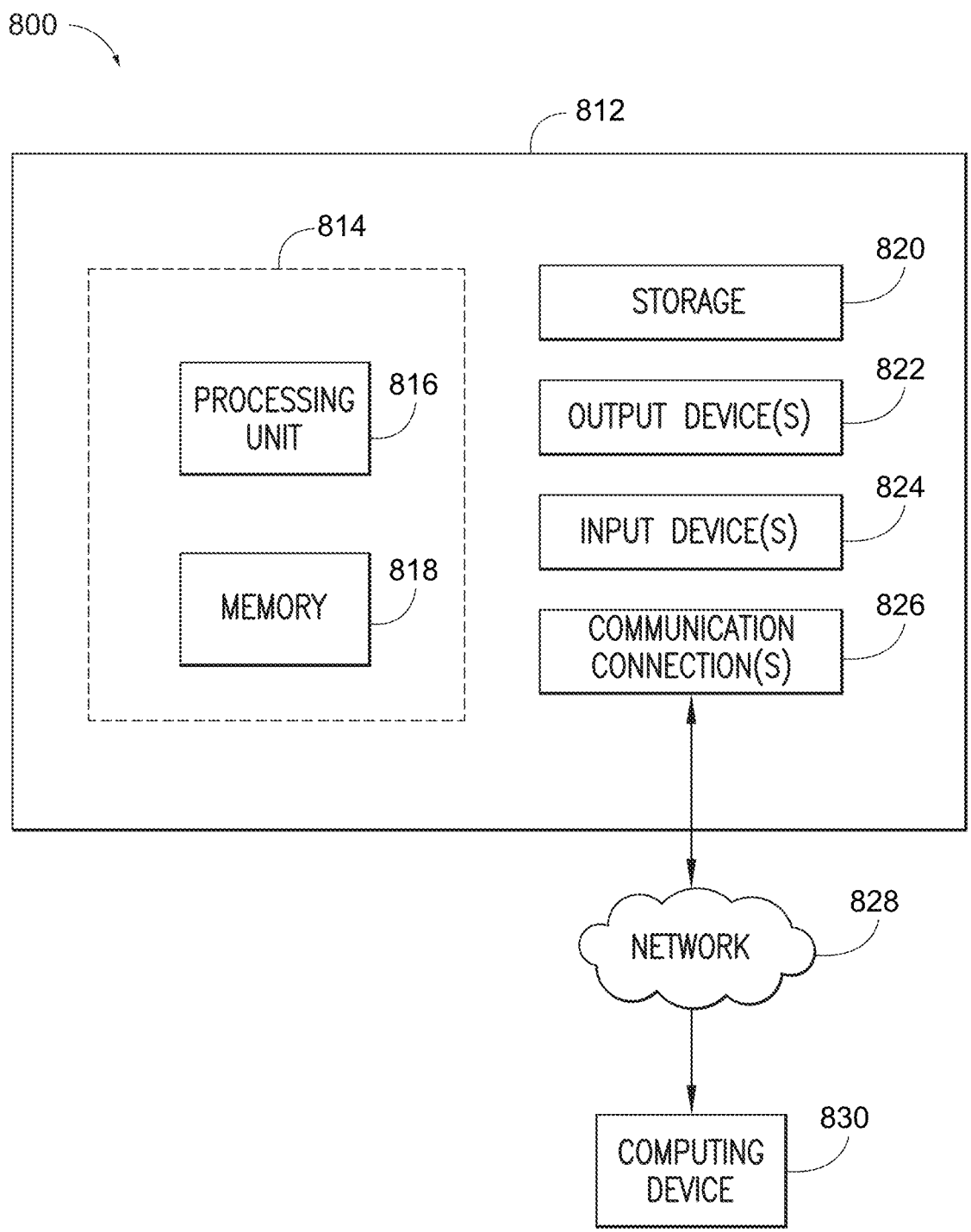
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the computing device 812 includes additional features or functionality. For example, the computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for trajectory prediction, comprising:
a processor and a memory storing instructions, which when executed by the processor cause the processor to perform:
receiving a light detection and ranging (LiDAR) image sequence including a set of LiDAR images;
generating a LiDAR map based on the LiDAR image sequence;
generating an interaction encoder result by feeding the LiDAR image sequence through an interaction encoder;
generating a feature extractor result by feeding the LiDAR map through a feature extractor;
generating a relation encoder result by feeding a past trajectory of a detected obstacle from the LiDAR image sequence from a trajectory predictor, the interaction encoder result, and the feature extractor result through a relation encoder, wherein the trajectory predictor feeds back the past trajectory to the relation encoder;
generating an intention estimation result by feeding the relation encoder result through an intention estimator;
generating a conditional generative model result by feeding the past trajectory of the detected obstacle, the intention estimation result, and a probability map through a conditional generative model encoder; and
generating a trajectory prediction for the obstacle by feeding the relation encoder result, the past trajectory of the detected obstacle, and the conditional generative model result through the trajectory predictor.

2. The system for trajectory prediction of claim 1, wherein the interaction encoder result and the feature extractor result are summed and provided as an input to the relation encoder.

3. The system for trajectory prediction of claim 1, wherein the feature extractor or the interaction encoder include one or more 2D convolutional layers.

4. The system for trajectory prediction of claim 1, wherein the intention estimator includes one or more non-linear unit layers and one or more fully connected layers.

5. The system for trajectory prediction of claim 1, wherein the conditional generative model encoder includes one or more 2D convolutional layers and one or more fully connected layers, and wherein one or more of the 2D convolutional layers are associated with a non-linear unit function.

6. The system for trajectory prediction of claim 1, wherein the trajectory predictor includes one or more fully connected layers and one or more deconvolutional layers.

7. The system for trajectory prediction of claim 1, wherein generating the LiDAR map based on the LiDAR image sequence includes removing one or more dynamic obstacles from the LiDAR image sequence.

8. The system for trajectory prediction of claim 1, wherein the intention estimation result is a probability distribution of intentional goals associated with different zones within an environment.

9. The system for trajectory prediction of claim 8, wherein the trajectory prediction is a probability distribution of trajectories associated with the intentional goals associated with the different zones within the environment.

10. The system for trajectory prediction of claim 8, wherein a zone of the different zones is a portion of an intersection.

11. A system for trajectory prediction, comprising:
a light detection and ranging (LiDAR) sensor receiving a LiDAR image sequence including a set of LiDAR images;
a processor and a memory storing instructions, which when executed by the processor cause the processor to perform:
generating a LiDAR map based on the LiDAR image sequence;
generating an interaction encoder result by feeding the LiDAR image sequence through an interaction encoder;
generating a feature extractor result by feeding the LiDAR map through a feature extractor;
generating a relation encoder result by feeding a past trajectory of a detected obstacle from the LiDAR image sequence from a trajectory predictor, the interaction encoder result, and the feature extractor result through a relation encoder, wherein the trajectory predictor feeds back the past trajectory to the relation encoder;

generating an intention estimation result by feeding the relation encoder result through an intention estimator;

generating a conditional generative model result by feeding the past trajectory of the detected obstacle, the intention estimation result, and a probability map through a conditional generative model encoder; and generating a trajectory prediction for the obstacle by feeding the relation encoder result, the past trajectory of the detected obstacle, and the conditional generative model result through the trajectory predictor; and a vehicle system activating an associated vehicle system function based on the trajectory prediction for the obstacle.

12. The system for trajectory prediction of claim 1, wherein the interaction encoder result and the feature extractor result are summed and provided as an input to the relation encoder.

13. The system for trajectory prediction of claim 1, wherein the feature extractor or the interaction encoder include one or more 2D convolutional layers.

14. The system for trajectory prediction of claim 1, wherein the intention estimator includes one or more non-linear unit layers and one or more fully connected layers.

15. The system for trajectory prediction of claim 1, wherein the conditional generative model encoder includes one or more 2D convolutional layers and one or more fully connected layers, and wherein one or more of the 2D convolutional layers are associated with a non-linear unit function.

16. The system for trajectory prediction of claim 1, wherein the trajectory predictor includes one or more fully connected layers and one or more deconvolutional layers.

17. A computer-implemented method for trajectory prediction, comprising:

receiving a light detection and ranging (LiDAR) image sequence including a set of LiDAR images;

generating a LiDAR map based on the LiDAR image sequence;

generating an interaction encoder result by feeding the LiDAR image sequence through an interaction encoder;

generating a feature extractor result by feeding the LiDAR map through a feature extractor;

generating a relation encoder result by feeding a past trajectory of a detected obstacle from the LiDAR image sequence from a trajectory predictor, the interaction encoder result, and the feature extractor result through a relation encoder, wherein the trajectory predictor feeds back the past trajectory to the relation encoder;

generating an intention estimation result by feeding the relation encoder result through an intention estimator;

generating a conditional generative model result by feeding the past trajectory of the detected obstacle, the intention estimation result, and a probability map through a conditional generative model encoder; and generating a trajectory prediction for the obstacle by feeding the relation encoder result, the past trajectory of the detected obstacle, and the conditional generative model result through the trajectory predictor.

18. The computer-implemented method for trajectory prediction of claim 17, comprising summing the interaction encoder result and the feature extractor result and providing the sum as an input to the relation encoder.

19. The computer-implemented method for trajectory prediction of claim 17, wherein generating the LiDAR map based on the LiDAR image sequence includes removing one or more dynamic obstacles from the LiDAR image sequence.

20. The computer-implemented method for trajectory prediction of claim 17, wherein the intention estimation result is a probability distribution of intentional goals associated with different zones within an environment.

* * * * *